United States Patent
Tang

(10) Patent No.: US 9,296,308 B1
(45) Date of Patent: Mar. 29, 2016

(54) ELECTRIC VEHICLE WITH A STARTING POWER

(71) Applicant: Chin-Hsiang Tang, Taoyuan County (TW)

(72) Inventor: Chin-Hsiang Tang, Taoyuan County (TW)

( * ) Notice: Subject to any disclaimer, the term of this patent is extended or adjusted under 35 U.S.C. 154(b) by 0 days.

(21) Appl. No.: 14/525,277

(22) Filed: Oct. 28, 2014

(51) Int. Cl.
*H02P 1/00* (2006.01)
*B60L 11/18* (2006.01)
*H02P 1/18* (2006.01)

(52) U.S. Cl.
CPC .......... *B60L 11/1851* (2013.01); *B60L 11/1805* (2013.01); *H02P 1/18* (2013.01)

(58) Field of Classification Search
CPC .......... H02J 7/423; B60R 16/033; B60K 1/02
See application file for complete search history.

(56) References Cited

U.S. PATENT DOCUMENTS

2012/0319483 A1* 12/2012 Scruggs ................ B60R 16/033
307/52

* cited by examiner

*Primary Examiner* — Karen Masih
(74) *Attorney, Agent, or Firm* — Alan D. Kamrath; Kamrath IP Lawfirm, P.A.

(57) ABSTRACT

An electric vehicle includes a controlling device and a battery unit. The controlling device is connected to a switch, an electric motor, an accelerator controller, and a generator unit. The switch is connected to the generator unit. The battery unit includes a primary battery and a secondary battery. The primary battery is connected to the controlling device. The secondary battery is connected to the generator unit. When the switch is turned on, the controlling device and the generator unit are activated, and when the accelerator controller activates the generator unit via the generator unit controlling device, the controlling device firstly supplies power to the electric motor by the generator unit. After the electric motor has been started, the controlling device cuts off power supply from the generator unit to the electric motor, and the primary battery supplies power to the electric motor.

5 Claims, 2 Drawing Sheets

ELECTRIC VEHICLE WITH A STARTING POWER

BACKGROUND OF THE INVENTION

The present invention relates to an electric vehicle with a starting power and, more particularly, to an electric vehicle using a generator unit to provide the power required for starting the electric vehicle, avoiding loss of the primary battery.

With reference to FIG. 1, a conventional electric vehicle generally includes a power controller A connected to a switch B, a battery C, an accelerator controller D, and an electric motor E. When a user is intended to use the electric vehicle, the switch B is opened first to activate the power controller A, such that the user can use the accelerator controller D to control the electric motor E to run via the power controller A. The power controller A supplies power to the electric motor E via the battery C. However, the electric motor E needs a larger torque when starting the electric vehicle (from motionless to driving) and, thus, needs a large amount of power and electric current. Thus, the momentary output of the battery C increases, which tends to cause excessive loss of the battery C and, thus, shortens the service life of the battery C.

Thus, it is an important issue to avoid excessive battery loss while starting an electric vehicle.

BRIEF SUMMARY OF THE INVENTION

The primary objective of the present invention is to provide an electric vehicle using a generator unit to provide the power required for starting the electric vehicle, avoiding loss of the primary battery resulting from the large amount of power and electric current due to large momentary output of the battery unit.

To fulfill the above objective, the present invention provides an electric vehicle including a controlling device and a battery unit. The controlling device is connected to a switch, an electric motor, an accelerator controller, and a generator unit. The switch is connected to the generator unit. The battery unit includes a primary battery and a secondary battery. The primary battery is connected to the controlling device. The secondary battery is connected to the generator unit.

When the switch is turned on, the controlling device and the generator unit are activated, and when the accelerator controller activates the generator unit via the generator unit controlling device, the controlling device firstly supplies power to the electric motor by the generator unit.

After the electric motor has been started, the controlling device cuts off power supply from the generator unit to the electric motor, and the primary battery supplies power to the electric motor.

In an example, the controlling device includes a power switching controller connected to a driving controller. The switch is connected to the power switching controller and the driving controller. The accelerator controller is connected to the power switching controller and the driving controller. The electric motor is connected to the driving controller. The primary battery is connected to the power switching controller. The secondary battery connected to the switch.

In another example, the controlling device includes a power switching controller connected to a driving controller. The generator unit includes a DC motor connected to a speed reducing mechanism. The speed reducing mechanism is connected to a generator. The generator is connected to the power switching controller. The secondary battery is connected to the DC motor via the switch.

In a further example, the generator unit includes a DC motor connected to a speed reducing mechanism. The speed reducing mechanism is connected to a generator. The DC motor is connected to an air conditioner and the switch.

In still another example, the generator unit includes a DC motor connected to a speed reducing mechanism. The speed reducing mechanism is connected to a generator. The DC motor is connected to a flywheel and the switch.

The present invention will become clearer in light of the following detailed description of illustrative embodiments of this invention described in connection with the drawings.

DETAILED DESCRIPTION OF THE INVENTION

Figure 1:
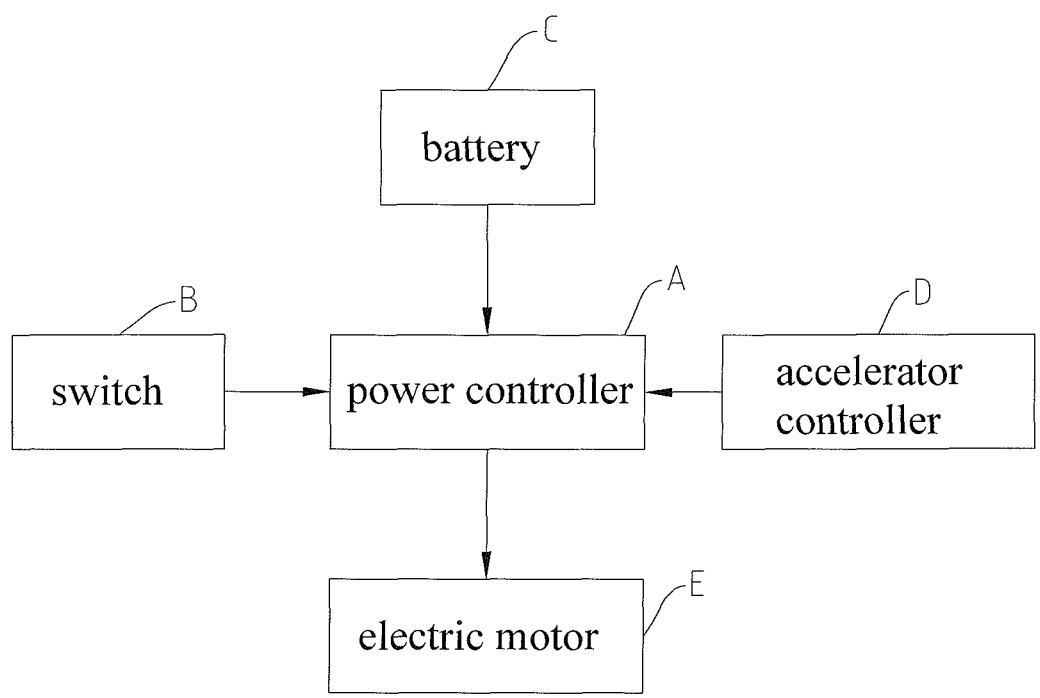
FIG. 1 is a block diagram of a conventional electric vehicle.
Figure 2:
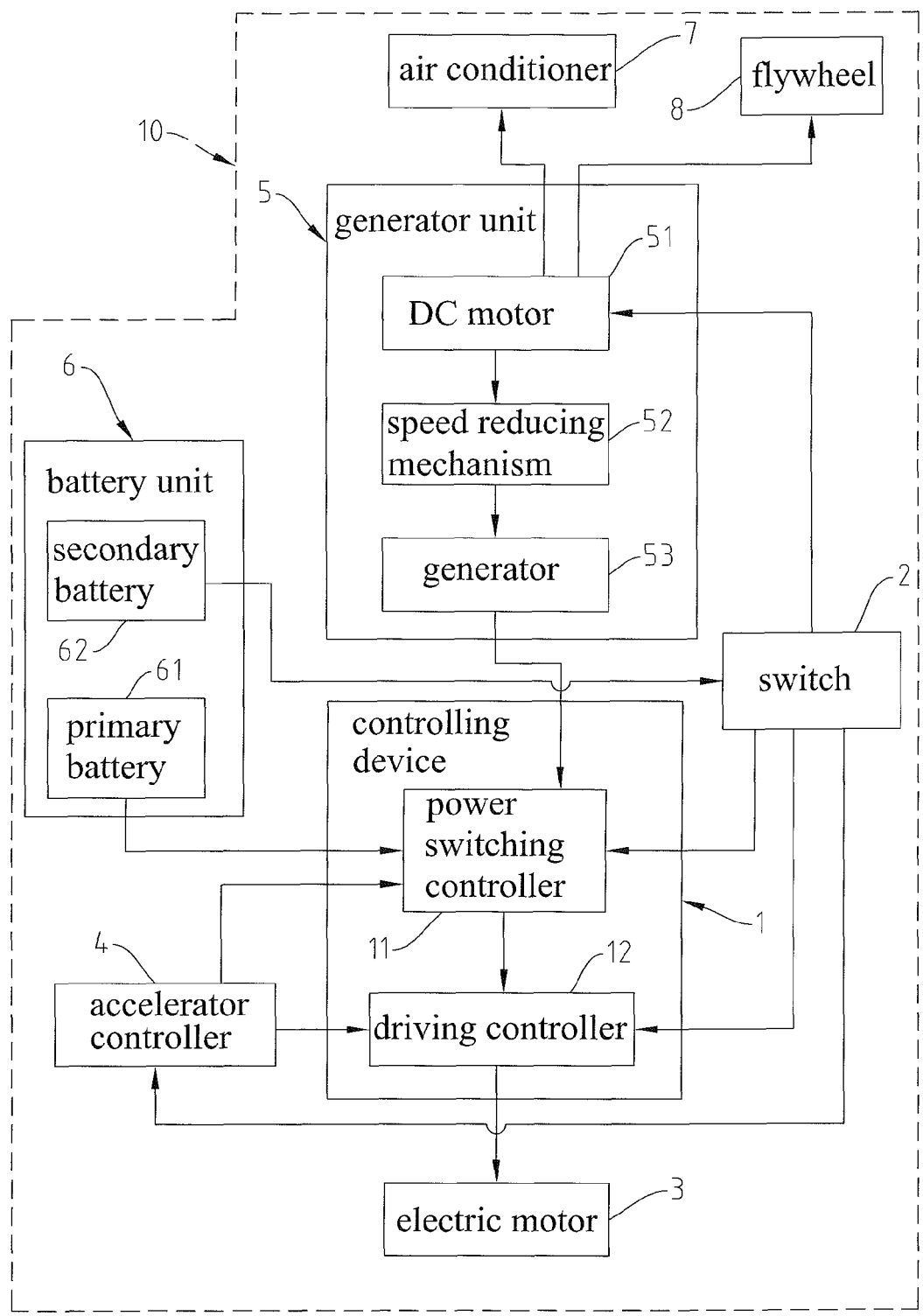
FIG. 2 is a block diagram of an electric vehicle of an embodiment according to the present invention.

With reference to FIG. 2, an electric vehicle 10 with a starting power of an embodiment according to the present invention includes a controlling device 1, a switch 2, an electric motor 3, an accelerator controller 4, a generator unit 5, a battery unit 6, an air conditioner 7, and a flywheel 8.

The controlling device 1 includes a power switching controller 11 connected to a driving controller 12. The switch 2 is connected to the power switching controller 11 and the driving controller 12. The switch 2 is used to activate or stop the power switching controller 11 and the driving controller 12. The electric motor 3 is connected to the driving controller 12. The electric motor 3 is used to drive the electric vehicle 10.

The accelerator controller 4 is connected to the power switching controller 11 and the driving controller 12. The accelerator controller 4 can be controlled by a user to control the operating speed of the electric motor 3 via the driving controller 12, thereby controlling the speed of the electric vehicle 10.

The generator unit 5 includes a DC (direct current) motor 51 connected to a speed reducing mechanism 52. The speed reducing mechanism 52 is connected to a generator 53. The generator 53 is connected to the power switching controller 11 of the controlling device 1. The DC motor 51 is connected to the switch 2 and can be controlled by the switch 2 to operate or stop.

The battery unit 6 includes a primary battery 61 and a secondary battery 62. The primary battery 61 is connected to the power switching controller 11 of the controlling device 1. The secondary battery 62 is connected to the switch 2. Thus, power can be supplied to the DC motor 51 of the generator unit 5.

The air conditioner 7 and the flywheel 8 are connected to the DC motor 51 of the generator unit 5. When the DC motor 51 operates, the air conditioner 7 and/or the flywheel 8 are actuated.

When the user is intended to use the electric vehicle 10, the switch 2 is used to activate the power switching controller 11 and the driving controller 12 of the controlling device 1. Furthermore, the secondary battery 62 powers the DC motor 51, such that the power switching controller 11, the driving controller 12, and the DC motor 51 operate. Furthermore, the switch 2 firstly makes the secondary battery 62 become conductive to the DC motor 51 to make the DC motor 51 drive the speed reducing mechanism 52 and the generator 53. After the generator 53 has generated power, the power switching controller 11 and the driving controller 12 are activated. Thus, before the generator 53 is started, the user cannot use the accelerator controller 4 to drive the electric vehicle 10.

When the user uses the accelerator controller 4 to operate the electric motor 3 through the power switching controller 11 and the driving controller 12 to thereby drive the electric vehicle 10 and when the driving controller 12 controls operation of the electric motor 3, if the electric vehicle 10 is about to start (i.e., from motionless to movement). The power switching controller 11 of the controlling device 1 will connect the generator 53 with the driving controller 12, such that the power generated by the generator 53 can be supplied through the driving controller 12 to the electric motor 3.

After the electric vehicle 10 has started up, the power switching controller 11 cuts off the power provided by the generator 53 and connects the primary battery 61 with the driving controller 12. Furthermore, the power of the primary battery 61 is supplied through the driving controller 12 to the electric motor 3. When the electric motor 3 uses the power from the primary battery 61 and if the user stops actuating the accelerator controller 4, the driving controller 12 will stop supplying the power from the primary battery 61 to the electric motor 3, such that the electric motor 3 is driven by the inertia of the electric vehicle 10 or stops.

When the user actuates the accelerator controller 4 again, the controlling pattern of the generator 53 and the primary battery 61 through the power switching controller 11 is repeated. The power generated by the generator 53 is an AC power, which is converted into a DC power and supplied to the electric motor 3 via the driving controller 12. After the switch 2 has made the secondary battery 62 become conductive, the DC motor 51 of the generator unit 5 keeps running, which not only provides the power required for starting the electric vehicle 10 but drives the air conditioner 7 and/or the flywheel 8. Thus, the user can adjust the temperature inside the electric vehicle 10 by the air conditioner 7, and the flywheel 8 connected to the DC motor 51 stores the inertia.

Furthermore, after the generator 53 has supplied the power to the electric motor 3 for a predetermined period of time, the power supply to the electric motor 3 can be switched to the primary battery 62 by the power switching controller 11 of the controlling device 1. Alternatively, a speed sensor (not shown) can be used to detect the speed of the electric vehicle 10, and if the speed of the electric vehicle 10 has reached a predetermined value, the power supply to the electric motor 3 is switched to the primary battery 61. Nevertheless, the above switching mechanism of the power switching controller 11 for the generator 53 and the primary battery 61 is merely a non-restrictive example and should not be used to limit the present invention.

In view of the foregoing, the present invention solves the disadvantages of the prior art and provides enhanced effects. The key technique of the present invention is that the power switching controller 11 of the controlling device 1 is used to supply the power generated by the generator 53 of the generator unit 5 through the driving controller 12 to the electric motor 3 while starting the electric vehicle 10, avoiding loss of the primary battery 61 resulting from the large amount of power and electric current due to large momentary output of the battery unit 6. Thus, the service life of the primary battery 61 can be prolonged.

Although specific embodiments have been illustrated and described, numerous modifications and variations are still possible without departing from the scope of the invention. The scope of the invention is limited by the accompanying claims.

The invention claimed is:

1. An electric vehicle with a starting power, with the electric vehicle comprising a controlling device and a battery unit, with the controlling device connected to a switch, an electric motor, an accelerator controller, and a generator unit, with the switch connected to the generator unit, with the battery unit including a primary battery and a secondary battery, with the primary battery connected to the controlling device, and with the secondary battery connected to the generator unit, wherein when the switch is turned on, the controlling device and the generator unit are activated, and when the accelerator controller activates the generator unit via the generator unit controlling device, the controlling device firstly supplies power to the electric motor by the generator unit, and wherein after the electric motor has been started, the controlling device cuts off power supply from the generator unit to the electric motor, and the primary battery supplies power to the electric motor.

2. The electric vehicle with a starting power as claimed in claim 1, with the controlling device including a power switching controller connected to a driving controller, with the switch connected to the power switching controller and the driving controller, with the accelerator controller connected to the power switching controller and the driving controller, with the electric motor connected to the driving controller, with the primary battery connected to the power switching controller, and the secondary battery connected to the switch.

3. The electric vehicle with a starting power as claimed in claim 1, with the controlling device including a power switching controller connected to a driving controller, with the generator unit including a DC motor connected to a speed reducing mechanism, with the speed reducing mechanism connected to a generator, with the generator connected to the power switching controller, and with secondary battery connected to the DC motor via the switch.

4. The electric vehicle with a starting power as claimed in claim 1, with the generator unit including a DC motor connected to a speed reducing mechanism, with the speed reducing mechanism connected to a generator, and with the DC motor connected to an air conditioner and the switch.

5. The electric vehicle with a starting power as claimed in claim 1, with the generator unit including a DC motor connected to a speed reducing mechanism, with the speed reducing mechanism connected to a generator, and with the DC motor connected to a flywheel and the switch.

* * * * *